United States Patent [19]
Gotsch, Jr.

[11] 3,887,207
[45] June 3, 1975

[54] CART

[75] Inventor: John M. Gotsch, Jr., Westfield, N.J.

[73] Assignee: Gauer Metal Products, Inc., Kenilworth, N.J.

[22] Filed: Mar. 1, 1973

[21] Appl. No.: 337,099

[52] U.S. Cl. ....... 280/33.99 T; 108/111; 24/222 BS
[51] Int. Cl. ........................................... B62d 39/00
[58] Field of Search ..... 280/33.99 T, 33.99 R, 79.1, 280/79.3, 47.34; 108/111; 211/148; 24/222 R, 222 BS

[56] References Cited
UNITED STATES PATENTS

| | | |
|---|---|---|
| 2,627,637 | 2/1953 | Downing .......................... 24/222 BS |
| 3,227,110 | 1/1966 | Hamilton .......................... 108/111 |
| 3,608,920 | 9/1971 | Rubin .......................... 280/33.99 T |
| 3,689,098 | 9/1972 | Rubin .......................... 280/79.1 |
| R27,683 | 6/1973 | Rubin .......................... 280/33.99 T |

Primary Examiner—Philip Goodman
Assistant Examiner—John A. Carroll

[57] ABSTRACT

A cart comprising a deck member and a pair of detachable upstanding end frames. A key-slot and stud arrangement is provided near the top of each end frame for releasable interlocked storage thereof. The wheel pairs of the deck member are off-set to permit deck nesting when stored, and removable partitions can removably mount on the end frames and serve either as horizontal shelving or vertical side walls.

9 Claims, 11 Drawing Figures

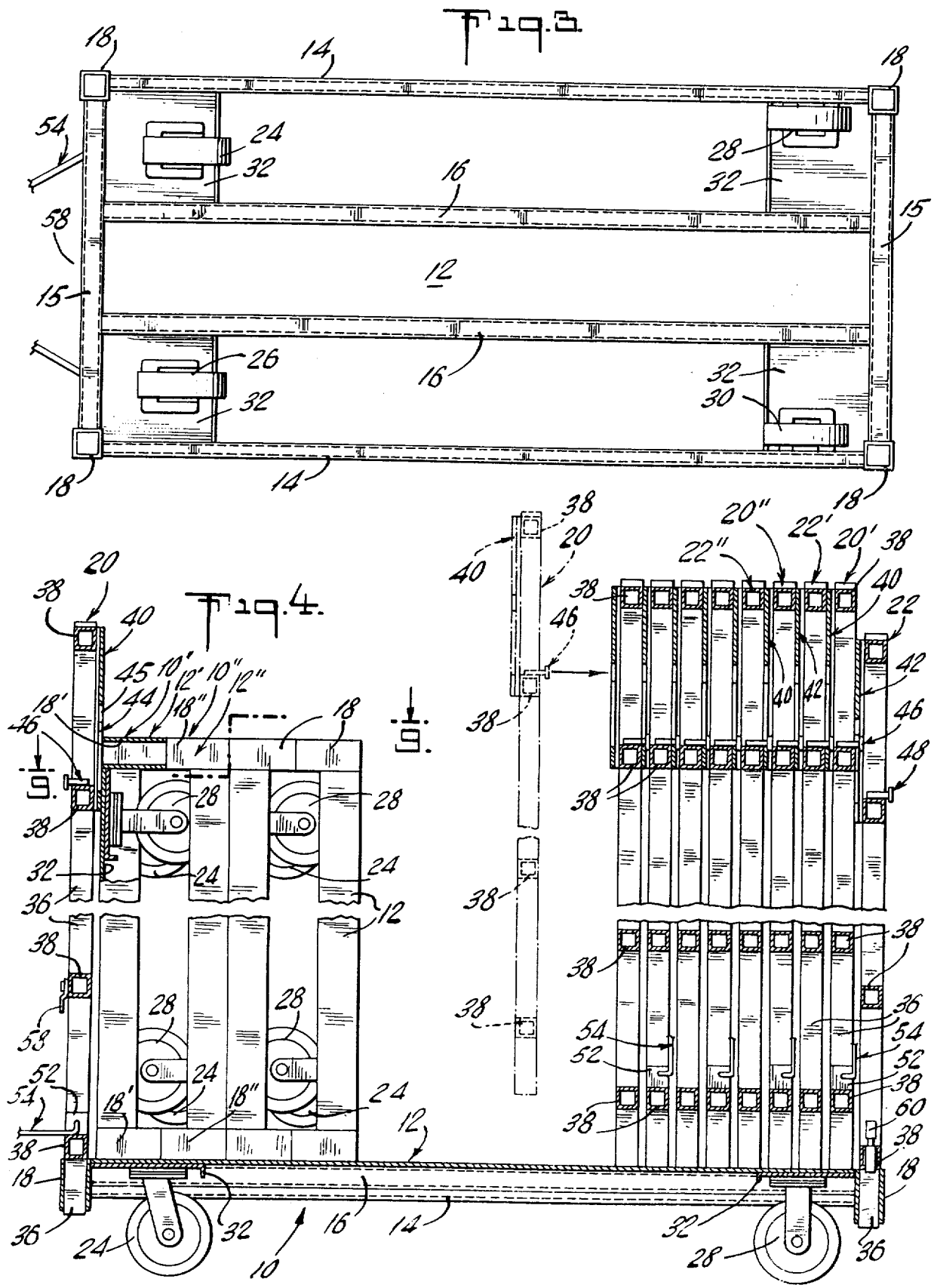

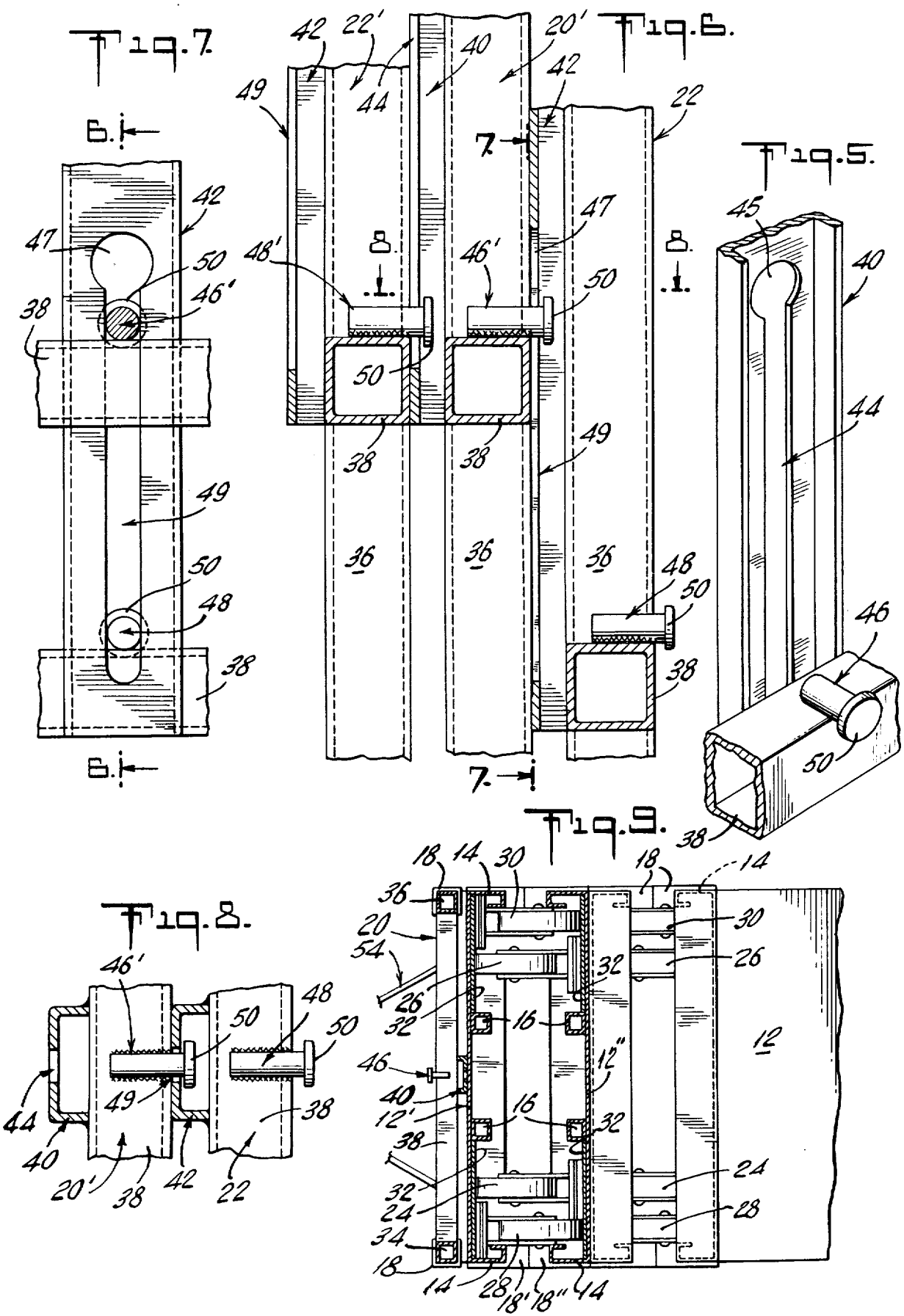

CART

BACKGROUND

The present invention relates to improvements in wheeled carts of the type that can be disassembled and, by virtue of their design, their parts can be stored on a mother cart of the same construction and design. See for example U.S. Pat. No. 3,608,920 which discloses a cart comprising a wheel-mounted platform fitted with corner posts that releasably support upstanding front and back end frames.

Carts of this general type have been known for many years. However, there is a need in the art in which the various parts can be handled more efficiently and safely when assembling them onto and disassembling them from the stored position on a mother cart. Furthermore, a principle technical goal in the art is to design the various parts and components of the cart assembly so that the maximum number of carts can be stored on a mother cart for a given longitudinal dimension thereof.

OBJECT

It is an object of the present invention to provide a cart of the type described which solves the technical problems and achieves the advantages described above.

It is a further object of the invention to provide a cart whose parts cooperate with parts of other similar carts for efficient storage on a mother cart of similar design or elsewhere as desired.

A further object is to provide a cart assembly that can function alternately as an open cart and a wheeled bin.

Other objects of the invention will become apparent with the following disclosure.

SUMMARY OF THE INVENTION

In a cart according to the present invention, the upper portion of the front and back end frames are provided with means for releasably interlocking the upper ends when the end frames are removed from the deck member and placed in their stored position with the feet of the stored end frames resting on the deck of a mother cart or the floor of some designated storage area. The forward end frame is provided with a hitch assembly including means permitting the hitch to rotate to a horizontal position and fasten onto a hitch post on the next forward cart. When not in use or when in the stored position, the hitch is rotated and secured in a vertical position along the frame.

In addition to storing the end frames on a mother cart, the deck members associated with the end frames may be stored thereon by resting the deck members in an upright position on the deck of the mother cart. To achieve optimum space efficiency and economy, the forward wheels of each cart are spaced from the associated deck corner a different distance from that of the back wheels so that two deck members can be nested with wheels interlocked or overlapping each other to permit more deck members per unit of space along the longitudinal dimension of the mother cart.

BIN

The cart is provided with shelving members that can mount flat between the end frames in vertically spaced relation or be easily removed and mounted to form side walls between the end frames enabling the cart to function as a wheeled bin.

Other and further advantages and features of the invention will become apparent with the following detailed description when taken in view of the appended drawings.

BRIEF DESCRIPTION OF DRAWINGS

FIG. 3 is an inverted plan view of the deck member.

FIG. 4 is a side elevation with parts in section of a mother cart and a plurality of stored end frames and deck members.

FIG. 5 is an enlarged fragmentary perspective of the interlocking retaining members of the end frames.

FIG. 6 is a fragmentary side elevation of a number of end frames in the stored position and interlocked with one another and an end frame of a mother cart.

FIG. 7 is a section taken along line 7—7 of FIG. 5.

FIG. 8 is a section view taken along line 8—8 of FIG. 6.

FIG. 9 is a section taken along broken lines 9—9 of FIG. 4.

DETAILED DESCRIPTION

Figure 1:
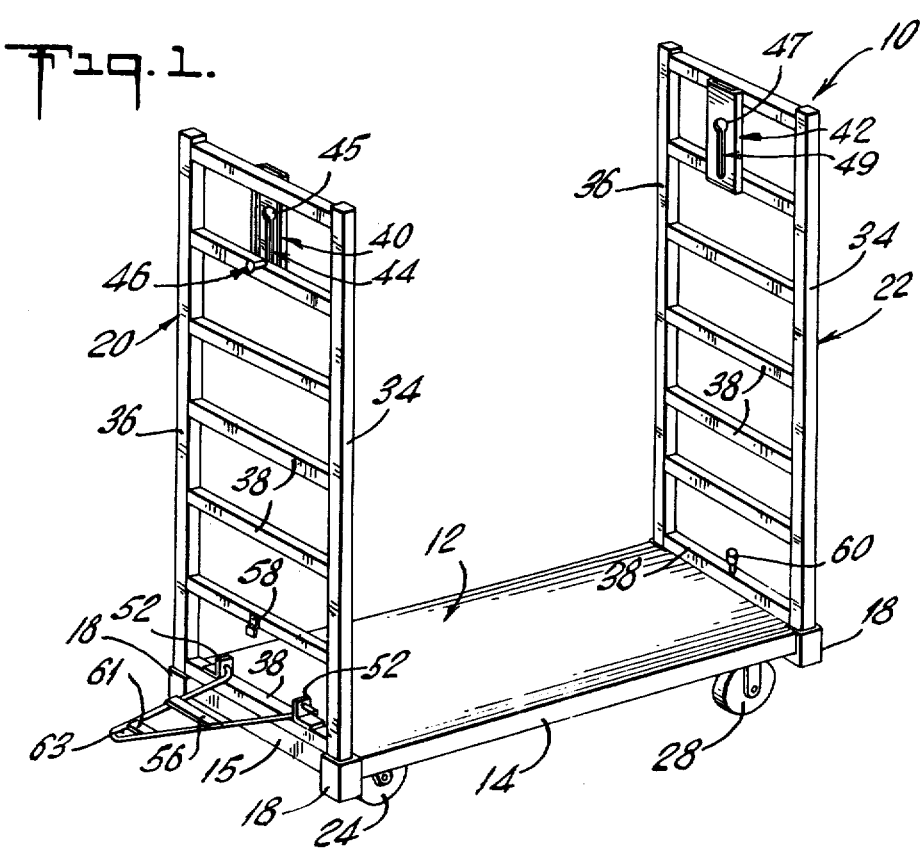
FIG. 1 is a perspective view of one embodiment of a cart according to the present invention.
Figures 2, 10:
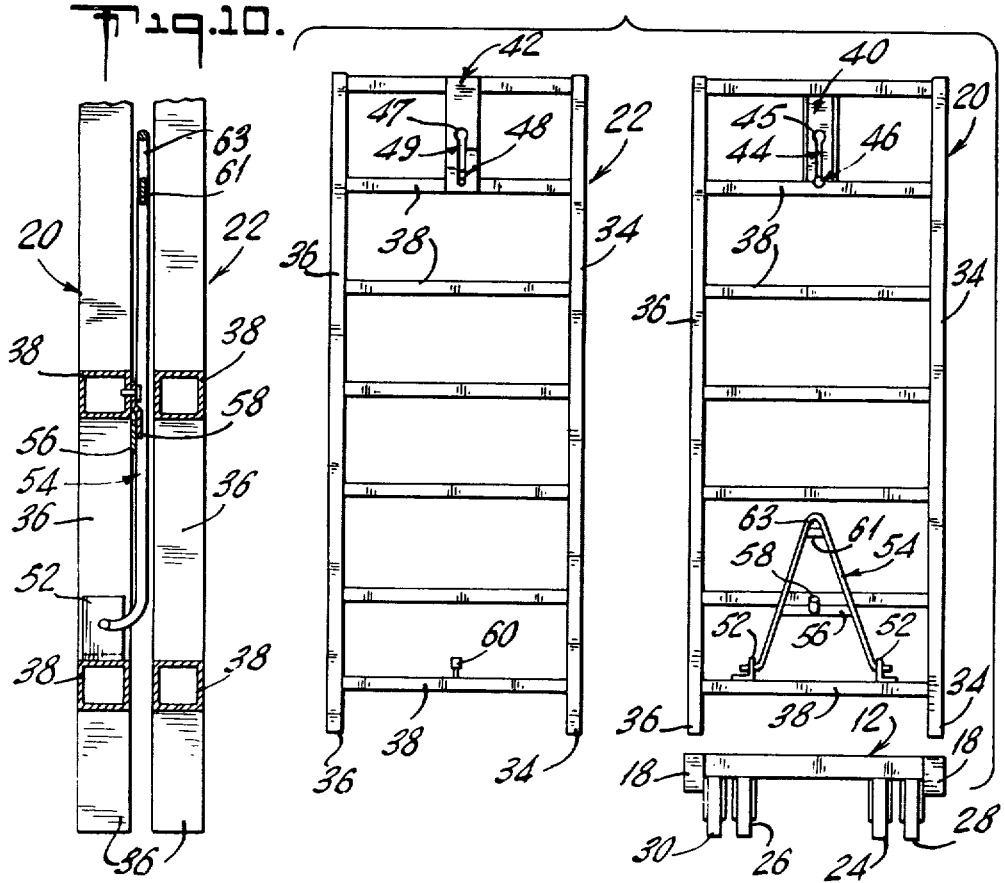
FIG. 2 is an exploded end view of the parts of FIG. 1 with hitch shown in stored position.
FIG. 10 is a fragmentary view of a portion of FIG. 4 showing the latching of the hitch.

With reference to FIG. 1, 2, 3, and 5, one embodiment of a cart 10 according to the invention comprises an elongated deck member 12 having side skirts 14 and skirts 15, and longitudinal box girders 16 serving to increase the strength characteristics of the cart. Deck member 12 could be slatted or of formed channel construction, if desired, such as that shown in FIG. 11. Tubular posts 18 are arranged generally vertical at the corners of deck member 12 and cooperate to receive the legs of forward and rear frames 20 and 22, respectively.

Deck member 12 is fitted with and, when in use, supported by caster assemblies 24 and 26 at the forward end and fixed wheel assemblies 28 and 30 at the rear, which may be welded or otherwise connected through mounting plates 32 fixed to the underside of deck 12. To enable deck member nesting when stored, forward casters are off-set either in the longitudinal or transverse or both directions of the deck member corners relative to the corner relationships of the rear wheels. In this embodiment, as better seen in FIG. 3, the transverse spacing between casters 24 and 26 is less than that of wheel assemblies 28 and 30.

One example of end frames 20 andd 22 each include a pair of vertical side support rails 34 and 36 with a plurality of vertically spaced, horizontally arranged rungs 38 connected therebetween to form a ladder-shaped configuration. The vertical rails 34 and 36 extend below the bottom rung on each frame member 20 and 22, preferably an equidistance, and seat within the respective corner posts 18 when cart 10 is assemblied for use. When assembled, the bottom rung on each frame member rests on deck 12.

According to one example of the invention, the detachable retaining means for interlocking the tops of the end frames when stored comprises a vertical channel member 40 and 42 welded or otherwise fixed between the top and adjacent rungs of end frames 20 and 22, respectively. Channel member 40 and 42 are preferably mounted along the center lines of frames 20 and 22, respectively. The webs of channel members 40 and 42 define key slot openings 44 and 49. Studs 46 and 48 on frames 20 and 22, respectively, are each fixed to the rung generally as shown and in alignment with the key slot openings 44 and 49. The studs 46 and 48 include a shank portion dimensioned to fit through the narrow portion of slots 44 and 49 and an enlarged button 50 and 51 at the free end spaced forward from the associated rung and dimensioned to fit through the enlarged opening 43 and 45 at the top of the key slot, but having a dimension greater than the narrow portion of slot.

Forward frame 20 serves to mount the hitch assembly by means of brackets 52 fixed to the bottom rung thereof. Hitch 54 rotates free in brackets 52 between the horizontal position shown in FIG. 1 and the stored, vertical position shown in FIG. 2. Hitch 54 includes a cross plate 56 that cooperates with a retaining finger 58 that is rotatably mounted to the next higher rung on frame 20. When hitch 54 is in the stored position, finger 58 can be rotated to engage plate 56. Hitch 54 is released for vertical rotation by moving finger 58 from said engagement. The free end of hitch 54 tapers to an apex and includes a hitch-retaining plate 61 to define hitch post receiving opening 63. An alternate arrangement can be seen in FIG. 11. The hitch mounting brackets 1 have enlarged vertical slots permitting vertical movement of hitch 54. Cross plate 3 defines keyslot 5 that cooperates with stud 7 extending from rung 9. Stud 7 has an enlarged free end to retain hitch 54 in the stored position. To release hitch 54 for use, it is lifted so that stud 7 aligns with the large opening in slot 5 and then rotated to its horizontal position.

The rear frame member 22 is provided with a hitch post 60 upstanding from the bottom rung of the frame. Post 60 has an enlarged free end and a smaller dimensioned lower section to prevent inadvertent slipping of the hitch from the post 60 during use. If desired, post 60 may extend downward beyond the bottom rung (not shown) to fit into an opening (not shown) in the top rear portion of deck member 12. This arrangement would serve to index the rear frame member with the rear corner posts of deck member 12 and prevent inadvertent assembly of the rear frame at the forward end of the cart.

Cart 10 and its respective components may be made of any suitable material such as steel, aluminum, or magnesium. Although the end frames are shown of tubular welded construction, angle, channel, or pipe members may also be used.

In operation, each of a plurality of carts 10, 10', 10'', etc., may be assembled for use (as shown in FIG. 1) with the end frames 20 and 22 supported with their leg portions detachably seated in corner posts 18. It is preferable to orient the frame members as shown in FIG. 1 with the forward end frame 20 located at the deck end with the rotatable casters 24 and 26 and hitch 54 facing forward with channel member 40 facing toward the rear of the cart. Frame member 22 is arranged with its channel member 42 facing the forward end of the cart. With the parts so arranged, any of the similar carts is always prepared to function as a mother cart as described below.

To store other carts (10', 10'', etc.) of similar design on the mother cart, hitch 54' is placed in the stored position and held by finger 58'. Either one of the frames 20' and 22' is then lifted from corner post 18' and brought into a contiguous position with either the forward or rear frame member 20 and 22 as desired. In this example, the forward member 20' of a disassembled cart is brought into alignment with the end frame 22 of the mother cart. See FIGS. 4 and 5. This first stored frame 20' is lifted and moved toward frame member 22 so that the free end of stud 46' penetrates the large aperture 47 of the key slot 49 in channel member 42. Frame 20' is then lowered so that the narrow portion of stud 46' rides down along the narrow portion of slot 49. Frame 20' is lowered until its legs rest on and are supported by deck 12, better seen in FIG. 4. Because the legs of frame 20' rest on deck 12, the stud 46' rides only part way down slot 49. See FIGS. 4 and 7. Frame 20' is now in the stored position and held contiguous to end frame 22 by stud 46'.

It should be understood that end frame 20' may be initially skewed or tilted in the vertical plane transverse to deck 12 upon insertion of stud 46' into the key slot 49 and that end frame 20' need not be more exactly upright until it is lowered to permit its legs to rest on deck 12. This facilitates the ease and safety of storing end frames since the operator is normally standing at the side of the cart and naturally tends to tilt the end frame upon storage on the cart or removal therefrom.

Next, the rear frame 22' is lifted from the cart being disassembled and moved into its stored position so that its stud 48' penetrates the key slot of frame 20'penetration, After such penetration frame 22' is lowered until its legs rest on deck 12 in which case stud 48' rides downward to a position approximately at the bottom of the key slot in the channel member of frame 20'. See FIG. 6.

Deck 12' (FIG. 4) of the disassembled cart is now moved to its stored position with its supporting (flat) surface facing and contiguous to the rear of the forward frame 20. Deck member 12' is supported on its front or rear surfaces (in this example front surfaces) in the upright position, generally as shown.

The above process may be repeated for the end frames of the next cart that is to be disassembled and stored such that frame members 20'' and 22'' are supported on deck 12 of the mother cart and are retained near their tops by respective studs fitted into the adjacent key slots of the adjacent end member as shown in FIG. 4. Deck member 12'', however, is stored upright on its rear surfaces with its wheels facing frame 20 of cart 10 so that the wheel assemblies of deck members 12' and 12'' overlap or interlock each other in the longitudinal direction, permitting these deck members to nest and occupy a space less than twice their height when in their stored position. Deck 12' and 12'' are moved together until corner posts 18' and 18'' come in mutual contact, which indicates a proper nest and aids stability.

The above process may be again repeated for succeeding carts to be disassembled and stored on mother cart 10 until essentially all available space along deck 12 is utilized. The longitudinal dimension of deck 12 is preferably selected such that there is an acceptable close tolerance of longitudinal free space available when cart 10 is fully loaded with stored disassembled carts. Also, the last stored deck member can be stored without nesting to facilitate removal thereof without the need to first remove end frames or a pair of nested deck members.

In reassembling carts, a free deck member is removed first and placed on its wheels. The first free end frame is lifted until its stud clears the enlarged portion of the respective slot and the frame member is withdrawn and mounted in the corner posts as described. The next frame member is also withdrawn and mounted on the remaining corner posts. The reassembled cart is now ready for operation. These steps are repeated as desired.

It should be understood that a cart according to the invention lends itself to a number of advantageous in addition to the storage arrangement described above. For example, the end frames may be stored on the floor instead of a mother cart deck. The first frame may lean against a wall or stationary structure and additional frames may be stored interlocked with each other as described, or the interlocked frames may be stored flat on the floor or flat on a deck member. The deck members may be nested and stored upright on the floor or flat, one pair on top of the other, on the floor or on a wheeled deck member with end frames removed.

The present cart also enabled an assembled mother cart to receive and store to its capacity (if desired) only interlocked end frames either with alternate front and rear frames interlocked or with all forward frames at one end of the cart and rear frames at the other. A second mother cart may be used to store only nested deck members in upright position.

Figure 11:
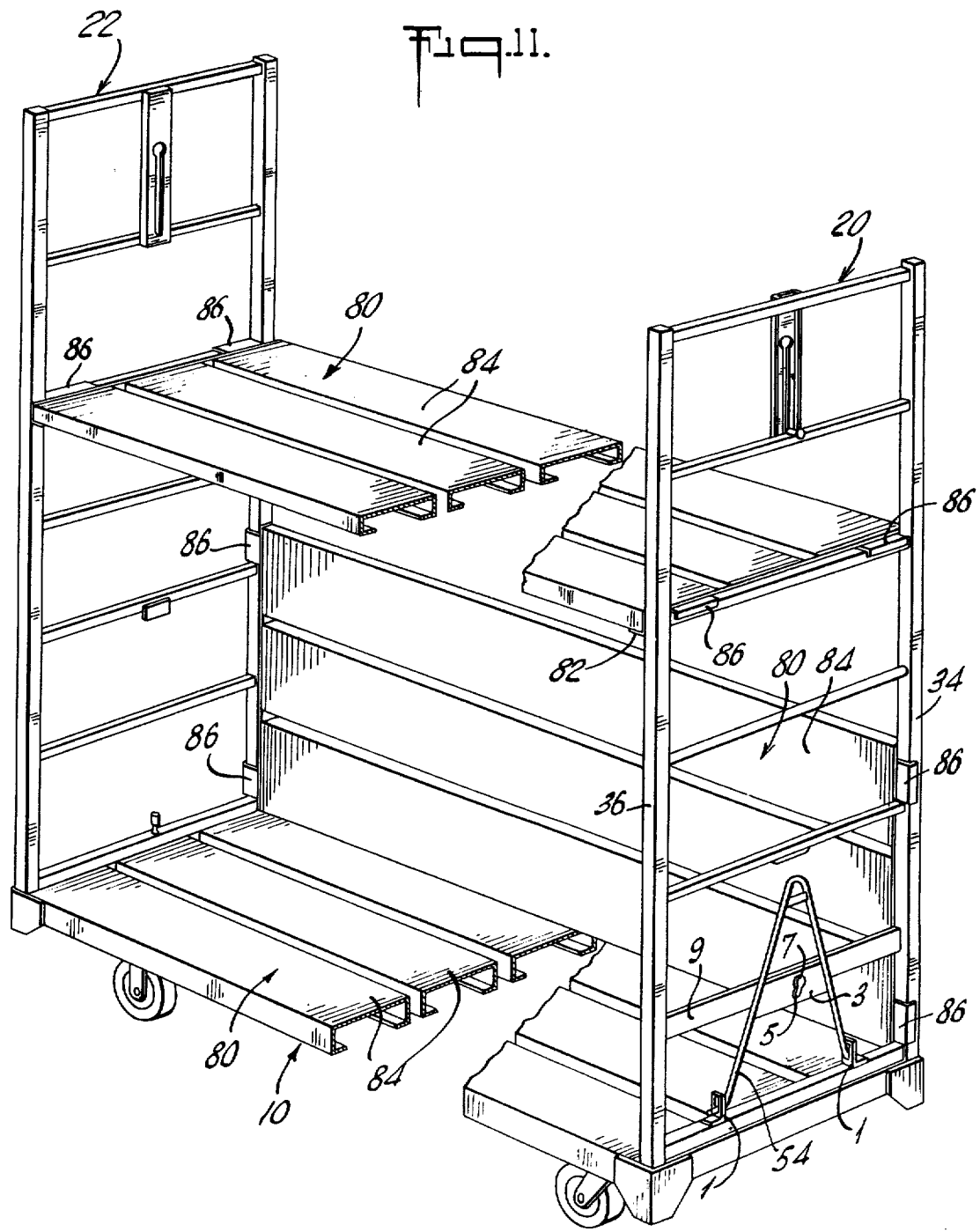
FIG. 11 is perspective of a cart assembly with shelving and side-wall members.

With reference to FIG. 11, a cart assembly according to the invention can function as an open shelf carrying cart and a wheeled bin as desired. A number of shelf and side combination members 80 are provided, each having transverse angle members at either end to which a generally flat member or a number of slats 84 are secured to form a supporting or partition surface. Each angle member 82 comprises a pair of spaced channel pieces 86 located toward the other regions of member 82. The openings of channel pieces face toward the bottom side of member 80. Member 80 extends to engage either the top of the respective rung on which member 80 may be mounted or the upstanding rails of frames 20 and 22. The dimension of piece 86 need only be sufficient to overhang the rung but is in close tolerance with the dimension of the upright rails 34 and 36 such that member 80 must be inserted and removed from its side-wall position by moving both ends thereof simultaneously in the transverse direction. In this way channel pieces 86 prevent one end of member 80 from inadvertently dislodging engagement with its upstanding rail. Also, each piece 80 rests on a rung member for vertical support which maintains the member 80 upright and prevents its upper portion from falling away from the frame rails.

In operation, members 80 of the cart assembly can be mounted between corresponding rungs of end frames 20 and 22 to function as shelving. Certain members 80 can be removed and reassembled as side-wall partitions on one or both sides of deck member 12, which converts the cart to a wheeled bin, which can be loaded with sacks or potatoes, letters, and the like. If desired, the bottom portions of frames 20 and 22 can be made with additional slats or plating so that smaller items may be reliably carried.

When stored, members 80 of many carts may be stored flat on each other and on the mounted members 80 of an assembled cart or stood upright but leaning against one or both end frames of the assembled cart, or in any other suitable way.

It will be understood that only one preferred embodiment of the invention has been disclosed herein and that various modifications and changes may be made to said embodiment without departing from the spirit and scope of the present invention.

What is claimed is:

1. A cart comprising a deck member, a pair of end members detachably mounted upright at opposite ends of said deck member, at least one end member from another cart of similar design being supportable by the deck member contiguous to one of the end members, and retaining means integral with each of the end members for releasably interlocking the at least one end member with said one of the end members when contiguous thereto, and wherein said retaining means of each end member comprises a projecting member extending from one side of the end member for releasably engaging an adjacent end member when the end member is moved so that its projecting member is moved into a predetermined relation with the adjacent end member and then lowered relative thereto.

2. A cart according to claim 1 wherein the retaining means further comprises a receiving member on the other side of the end member for releasably receiving the projecting member of another end member.

3. A cart according to claim 2 wherein the projecting member and receiving member, respectively, comprise a stud having an enlarged free end and means defining an upright slot with an enlarged opening near the top thereof and a narrow portion to retain the stud, the height of the slot being sufficient to enable the received stud of an adjacent end member to lower until the latter end member is supported by the deck member.

4. A cart according to claim 1 wherein one of the mounted end members comprises a forward end member having a hitch rotatably mounted near the bottom thereof and means to releasably retain the hitch in an upstanding position along the end member when stored.

5. A cart according to claim 4 wherein the other mounted end member comprises a rear end member having a hitch post near the bottom thereof to releasably receive and cooperate with a hitch of a cart of similar design.

6. A cart according to claim 1 wherein the end members include vertically spaced supporting horizontal surfaces and vertical members along the sides thereof at least near the bottom thereof, partitions having means extending therefrom for engaging the horizontal surfaces of the end members enabling the partition to function as a shelf extending between the end members and for engaging the vertical members enabling the partition to function as a side-wall extending between the end members.

7. A cart comprising a deck member, a pair of end members detachably mounted upright at opposite ends of said deck member, at least one end member from another cart of similar design being supportable by the deck member contiguous to one of the end members, and retaining means integral with each of the end members for releasably interlocking the at least one end member with said one of the end members when contiguous thereto, and wherein the deck is mounted on a front and rear pair of wheels that are arranged to permit deck nesting with another deck member of similar design when the other deck is arranged with its front and back ends respectively aligned with the back and front ends of the first mentioned deck member and the undersides of the deck members are facing each other.

8. A cart according to claim 7 wherein the deck member comprises corner posts for receiving depending legs of the end members, the corner posts having a height sufficient to permit mutual contact between opposing corner posts of nested deck members.

9. A cart assembly comprising an elongated wheeled deck member having an open corner post at each corner thereof, a forward end frame of ladder-like configuration having its legs removably mounted in the forward corner posts with its bottom rung supported on the top of the deck member, a hitch rotatably mounted to the bottom rung of the forward end frame and hitch retaining means on a rung above the bottom rung for releasably retaining the hitch in a vertical stored position, a stud extending forward from a rung near the top of the forward end frame and a member defining a vertical key slot at the back of the forward end member with the enlarged opening vertically upward from the stud and a portion narrower than the free end of the stud extending the distance between the enlarged opening and the stud, said stud and slot being aligned along the vertical center of toe forward end frame, a rear end frame having the same height and rung configuration as the forward frame with its legs releasably mounted in the rear corner posts and the bottom rung thereof resting on the deck member, a hitch post upstanding from the center of the bottom rung to cooperate with a hitch of another similar cart, a stud extending rearward from a rung equidistant above the bottom rung as is the first stud on the forward frame above the bottom rung thereof, a member on the forward side of the rear frame defining a key slot opening with an enlarged opening at the top thereof and depending narrow portion extending downward into alignment with the stud on the rear frame, said key slot opening and stud being arranged along the vertical center line of the rear end frame, a rear of forward end frame from a cart of similar design having its stud releasably interlocked with the key slot member of one of said rear or forward frames and having its legs resting on said deck member, and a further rear or forward end frame from a cart of similar construction having its stud releasably interlocked with the key slot member of said last-mentioned frame and having its legs resting on said deck member, said deck member having a forward and rear pair of supporting wheels, said forward wheels having a wheel base unequal to that of the rear wheels to permit the deck member to nest with a deck member from a cart of a similar design, and a pair of nested deck members from two other carts of similar design supported on the deck member in an upright position.

* * * * *